Aug. 21, 1923.
R. L. FRENCH
1,465,427
SIGNAL DEVICE FOR MOTOR VEHICLES
Filed April 26, 1922
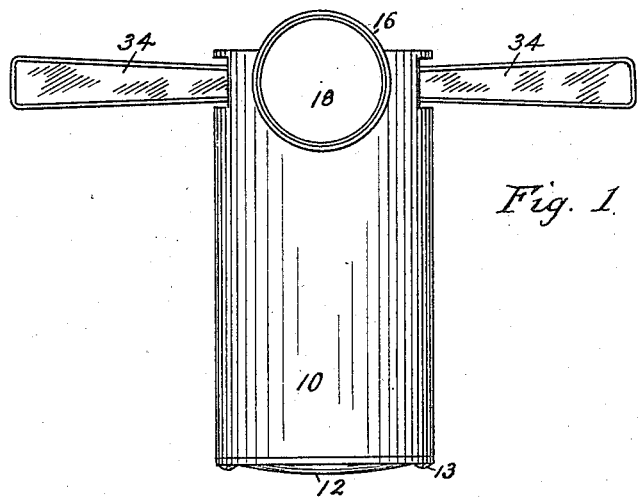
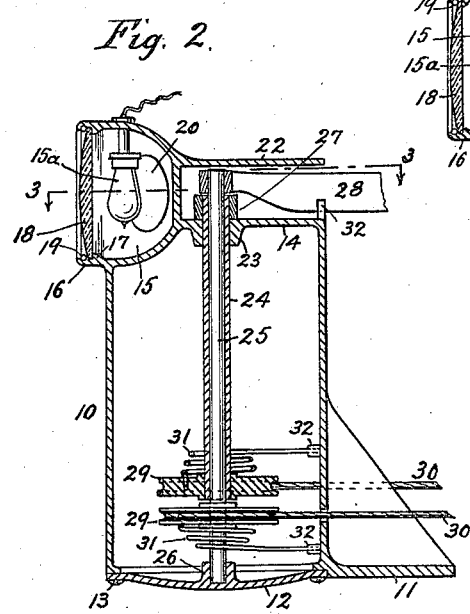
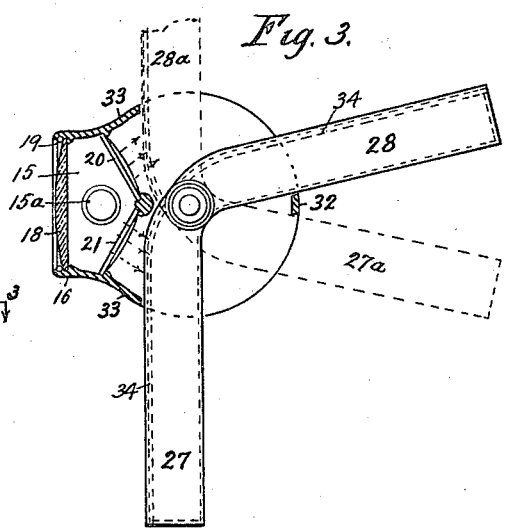
Inventor
Raleigh L. French.
By his Attorney
Wm Bodge Patented Aug. 21, 1923.

1,465,427

UNITED STATES PATENT OFFICE.

RALEIGH L. FRENCH, OF NEW YORK, N. Y.

SIGNAL DEVICE FOR MOTOR VEHICLES.

Application filed April 26, 1922. Serial No. 556,743.

*To all whom it may concern:*

Be it known that I, RALEIGH L. FRENCH, a citizen of the United States and resident of New York, in the county of New York and State of New York, have invented certain new and useful Improvements in Signal Devices for Motor Vehicles, of which the following is a specification.

The invention relates to improvements in signal devices adapted for attachment to motor vehicles for indicating the position or movements thereof with respect to the road.

The objects of the present invention are to provide a simplified construction and arrangement of parts for operating a pair of signal arms, and to afford means for illuminating the latter together with the rear or tail end safety light from the rays of a single lamp.

A further object is to provide weatherproof protecting casings for the several operative parts.

For full comprehension of the invention, and of the objects and advantages thereof, reference will be had to the following description and accompanying drawings, and to the appended claims in which the various novel features of the invention are more particularly set forth.

Figure 1 is a side view showing the device in operative position as observed from a following car.

Figure 2 is a vertical section showing the relation of the several operating parts with respect to one another.

Figure 3 is a horizontal section taken along the lines 3—3, Fig. 2.

In the drawings numeral 10 designates a cylindrical case having at its lower end a bracket 11, adapted to be connected at a convenient point upon the rear end of a car. Also at its lower end the case is provided with a head 12, detachably secured in position by the screws 13. At its upper end the case is formed with an integral head 14, which merges into the side walls of a lamp chamber 15 having a rearwardly extending tail-light opening provided with a cylindrical rim 16, having an interior annular seat 17, arranged to carry the lens 18, the latter being secured in position by the spring ring 19 yieldingly secured in a suitably positioned annular groove formed in the interior of the rim. Similar openings fitted with lenses 20 and 21 are formed in the lamp chamber 15 and arranged to direct the rays of light from the lamp 15ª secured within said chamber.

A guard plate or wall 22 is formed at the top of the case in spaced relation with the head 14, the latter having a hub 23 in which is rotatably mounted the tubular shaft 24, loosely surrounding the solid shaft 25, rotatably journaled at its lower end in the bearing or hub 26 formed on the interior of the head 12. To the upper end of the tubular shaft 24 is fixed a signal arm 27 and to the corresponding end of the solid shaft 25 is also fixed a similar arm 28, the hub connections therefor being disposed in offset relation on the arms to permit the projecting ends of the latter to assume a common horizontal plane of motion.

For effecting the independent movement of the signal arms through their shafts 24 and 25, the shafts are each fixedly secured at their lower ends with the grooved wheels 29, having operating ropes 30 secured thereto and leading in any approved manner to a convenient position for manual operation. The wheels 29 are provided with helical springs 31 surrounding their respective shafts, the opposite ends of the springs being respectively secured to the wheels and to the lugs 32 formed on the interior of the case, the latter connection being arranged to exert a tension through the springs to rotate the wheels 29 in opposite direction to the pulling action of the ropes 30, the normal action of the springs serving to swing and to hold the signal arms into their unobserved position against the stop 32 formed on the case. The movement of the arms to their opposite or observed position is limited by the wall sections 33 connecting the upper head 14 and guard plate 22.

The signal arms are preferably of hollow construction provided with a glass front face 34 through which the rays of light may pass from the lamp chamber 15 into the arms and in turn be reflected outward therefrom to serve as a signal light, the wall sections 14, 33 and 22 acting to direct the rays of light from the lamp chamber into the arms at a point adjacent their hubs.

Under a pulling action of the ropes 30, it will be apparent that either one of the signal arms may be independently operated into their respective observation positions for indicating the direction in which the car is about to move, or both arms may at the same time be operated into observation position as indicating the car is about to be stopped.

It will be obvious that the above described arrangement provides for a close concentration and distribution of the rays of light from a single lamp to effect the illumination of both the tail light and the signal arms.

What I claim as my invention and desire to secure by Letters Patent, is:

1. In a signal device, a supporting case, a central shaft journaled in the bottom wall of said case, a tubular shaft loosely surrounding said central shaft and extending above and journaled in the opposite upper wall of said case, the upper end of said central shaft extending above the said tubular shaft, a pair of signal arms fixed to the upper ends of said central and tubular shafts, and means within said casing for independently swinging said arms.

2. In a signal device, a supporting case, a pair of independently rotatable shafts loosely supported one within the other within said case and having their upper ends extending above the enclosure thereof, a pair of signal arms fixed to the upper ends of said shafts, outward and inward stops formed on said case and arranged respectively to limit the movements of said arms from an outward position of observation to an inward or unobserved position, yielding means normally acting to rotate and hold said arms against said inward stops, and manual means for rotating said arms into engagement with said outward stops against the action of said yielding means.

3. In a signal device, a supporting case, a pair of independently rotatable shafts loosely supported one within the other within said case and having their upper ends extending above the enclosure thereof, a pair of signal arms fixed to the upper ends of said shafts, wheels fixed to the lower ends of said shafts within said case and provided with ropes leading outwardly through the wall of said case and adapted to rotate said arms through said shafts into a position of observation, and springs within said case arranged to normally urge the arms into an inward or unobserved position.

4. In a signal device, a supporting case, a pair of independently rotatable shafts loosely supported one within the other within said case and having their upper ends extending above the enclosure thereof, a pair of signal arms fixed to the upper ends of said shafts, operating means connected to said shafts within said case, and a detachable head or closure for said case.

5. In a signal device, a case, a vertical shaft rotatable within said case, a tubular shaft loosely surrounding said vertical shaft, the upper ends of said shafts extending through the upper wall of said case, signal arms fixed to the upper ends of said shafts, a guard plate disposed above said signal arms, means within said case for independently swinging said arms in opposite directions, and stops limiting the swinging movement of said arms.

6. In a signal device, a case, a detachable head for said case, an internal shaft mounted within said case and journaled in said head, a tubular shaft loosely surrounding said internal shaft, an end of each of said shafts extending exteriorly through the wall of said case opposite said head, signal arms fixed to the exterior ends of said shafts, a guard plate disposed to cover said signal arms, means within said case for independently swinging said arms in opposite directions, and stops limiting the swinging movements of said arms.

7. In a signal device, a case, an internal shaft rotatable within said case, a tubular shaft loosely surrounding said internal shaft, one end of said shafts extending exteriorly through a wall of said case, a pair of signal arms fixed to the exterior ends of said shafts, a guard plate disposed to cover said signal arms, means within said case for swinging said arms in opposite directions, stops limiting the swinging movements of said arms, and means for illuminating said arms.

8. In a signal device, a case, a pair of shafts carried one within the other and rotatably mounted within the case, a pair of signal arms fixed to said pair of shafts and projecting exteriorly of said case, means within said case for operating said arms in opposite directions, and means within said case for illuminating said arms.

Signed at New York, in the county of New York and State of New York, this 24 day of April, A. D. 1922.

RALEIGH L. FRENCH.